United States Patent [19]
Rempe

[11] Patent Number: 6,035,773
[45] Date of Patent: Mar. 14, 2000

[54] METHOD OF CONTROLLING APPLICATION OF TWINE TO A BALE IN AN AGRICULTURAL BALER

[75] Inventor: Scott A. Rempe, Pella, Iowa

[73] Assignee: Vermeer Manufacturing Company, Pella, Iowa

[21] Appl. No.: 09/185,464

[22] Filed: Nov. 3, 1998

[51] Int. Cl.[7] ............................. B65B 63/04; A01F 15/07
[52] U.S. Cl. .................................. 100/2; 56/341; 100/5; 100/13; 100/4
[58] Field of Search .................. 100/2–5, 13, 87–89; 56/341

[56] References Cited

U.S. PATENT DOCUMENTS

| | | |
|---|---|---|
| 3,894,484 | 7/1975 | Anstey et al. . |
| 4,022,120 | 5/1977 | McAllister . |
| 4,167,844 | 9/1979 | Freimuth et al. . |
| 4,224,867 | 9/1980 | Gaeddert et al. . |
| 4,246,743 | 1/1981 | Anstee et al. . |
| 4,248,143 | 2/1981 | Gaeddert . |
| 4,354,429 | 10/1982 | Boldenow et al. . |
| 4,446,783 | 5/1984 | Illy ............................................ 100/13 |
| 4,457,226 | 7/1984 | Meiers . |
| 4,517,795 | 5/1985 | Meiers . |
| 4,557,189 | 12/1985 | Schaible . |
| 4,563,854 | 1/1986 | Ackermann et al. . |
| 4,602,560 | 7/1986 | Jacky . |
| 4,603,379 | 7/1986 | Strosser et al. . |
| 4,609,984 | 9/1986 | Strosser et al. . |
| 4,612,855 | 9/1986 | Wagstaff et al. . |
| 4,624,179 | 11/1986 | Yves et al. . |
| 4,630,191 | 12/1986 | Strosser . |
| 4,649,812 | 3/1987 | Mouret . |
| 4,656,930 | 4/1987 | Van Den Bossche et al. . |
| 4,656,931 | 4/1987 | Van Den Bossche et al. . |
| 4,674,403 | 6/1987 | Bryant et al. . |
| 4,742,768 | 5/1988 | Sheehan et al. . |
| 4,793,249 | 12/1988 | Wellman . |
| 4,796,524 | 1/1989 | Renaud . |
| 4,850,271 | 7/1989 | White et al. . |
| 4,855,924 | 8/1989 | Strosser et al. . |
| 4,885,990 | 12/1989 | Mouret ...................................... 100/13 |
| 4,924,405 | 5/1990 | Strosser et al. . |
| 4,998,469 | 3/1991 | Diederich, Jr. . |
| 4,998,961 | 3/1991 | Anderson et al. . |
| 5,079,898 | 1/1992 | Springs et al. . |
| 5,109,652 | 5/1992 | Viaud et al. . |
| 5,152,123 | 10/1992 | Viaud et al. . |
| 5,170,701 | 12/1992 | Viaud . |
| 5,184,545 | 2/1993 | Jennings et al. . |
| 5,215,005 | 6/1993 | Schlotterbeck et al. . |
| 5,226,359 | 7/1993 | Rempe . |
| 5,388,504 | 2/1995 | Kluver . |
| 5,444,969 | 8/1995 | Wagstaff et al. . |
| 5,551,218 | 9/1996 | Henderson et al. . |
| 5,557,510 | 9/1996 | McIntyre et al. . |
| 5,568,716 | 10/1996 | Kluver et al. . |
| 5,605,095 | 2/1997 | McClure . |
| 5,631,826 | 5/1997 | Chow ........................................ 100/4 |

FOREIGN PATENT DOCUMENTS

| | | |
|---|---|---|
| 41 16 619 | 11/1992 | Germany . |
| 2 153 293 | 8/1985 | United Kingdom . |

*Primary Examiner*—Stephen F. Gerrity
*Attorney, Agent, or Firm*—Merchant & Gould P.C.

[57] ABSTRACT

A method of applying twine to a bale in which the twine is applied between first and second bale positions separated by an axial length along the bale. The method includes the step of applying twine about the bale by rotating the bale while continuously moving a twine dispenser axially from the first bale position to the second bale position such that a continuous helical pattern of twine is wrapped around the bale.

8 Claims, 3 Drawing Sheets

METHOD OF CONTROLLING APPLICATION OF TWINE TO A BALE IN AN AGRICULTURAL BALER

FIELD OF THE INVENTION

The present invention relates generally to agricultural balers. More particularly, the present invention relates to agricultural balers for wrapping twine around cylindrical bales of forage crop.

BACKGROUND OF THE INVENTION

Previous controllers for balers for forming cylindrical bales of agricultural crop material have monitored the radius or diameter of the bale as it is being formed to control the bale-forming operation. An example of this is U.S. Pat. No. 5,551,218 to Henderson et al. Also, previous controllers for balers have automatically controlled the movement of a guide feed point for twine applied to the bale so as to place wraps around the bale. An example is U.S. Pat. No. 4,602,560 to Jacky, which records an operator's movement of the guide feed point during a manual or programming phase and duplicates this movement of the guide feed point when in an "automatic mode" for wrapping succeeding bales with twine. Further, a previous baler has controlled an actuator to rotate two twine guide tubes so as to apply twine from respective twine supply sources simultaneously, see U.S. Pat. No. 5,388,504 to Kluver.

In the Kluver patent, the actuator drives the two twine guide tubes in rotational movement so as to position the respective twine-outlet ends at a plurality of distinct positions A–L, as illustrated in FIGS. 3–4 thereof. The actuator is controlled using a microprocessor. The microprocessor includes, as inputs, signals from respective twine sensors, which sense each output signal upon rotation of respective sensor pulleys. The microprocessor controls the locations at which the actuator movement is temporarily halted (termed a "dwell" position) from a given period of time. Typically, the duration of the dwell is determined by counting a number of twine sensor pulses emitted on each rotation of a sensor pulley that conveys twine from a twine source to a bale, with the number of sensor pulses computed to correspond to the length of twine required to place one wrap around the circumference of the bale.

The actuator is driven at full speed between actuator dwell locations. In normal operation, an operator inputs the wrap spacings (i.e., the linear spacings along the bale of the distinct positions A–K), and the controller determines the number of sensed signals from the twine sensors that correspond to a single circumferential wrap around a completed bale. The controller then controls the movement of the actuator so as to apply a wrap at each wrap spacing by causing the duration of the dwell at each location to correspond to the computed number of signals from the twine feed sensor that correspond to one wrap. The operator may optionally designate different actuator extension positions for each dwell position (i.e., the wraps need not be equally spaced along the length of the bale), as well as any particular number of sensor pulses to be counted at each dwell position before the actuator moves the twine guide tubes to the next actuator extension position. The duration of the final actuator position will normally be longer in order to apply overlapping wraps at the positions closest to the ends of the bale in order to ensure that the twine does not become unraveled after the twine is cut and the bale is ejected from the baler.

One disadvantage of the control system in Kluver is that the motion of the actuator in placing the wraps is discontinuous. The actuator is driven at full speed between the dwell positions and is stopped at each dwell position. This inherently places unnecessary stress on the actuator and requires that the actuator motor be capable of dissipating the heat, resulting from the high currents associated with the actuator motor being repeatedly operated at nearly stall currents. This also tends to cause the spur gears, that position the twine guide tube ends symmetrically about the center of the bale, to undergo unneeded stress and vibrations resulting from the twine guide tubes being repeatedly accelerated in different rotational directions as the tubes are repeatedly started and stopped.

Another disadvantage is that the twine is inherently placed on the bale initially in a nonstable pattern when applying the "wraps," since the twine guide ends undergo a short burst of motion between each dwell position where one or more wraps are applied. This allows the twine of the "center wraps" to loosen from its initial position by slipping laterally so as to assume a more helical pattern. Another disadvantage is the requirement to measure or detect the position of the twine tubes at many discrete locations along the length of a given bale being wrapped.

SUMMARY OF THE INVENTION

One aspect of the present invention relates to methods and apparatuses for continuously applying twine about a bale in a helical pattern so that the twine will not loosen.

Another aspect of the present invention relates to a method of applying twine about a bale whereby twine dispensers are moved in a continuous motion rather than in a discontinuous manner, thereby reducing stress and vibration on the system components.

An additional aspect of the present invention relates to a method of applying twine to a bale. The twine is applied between first and second bale positions separated by an axial length along the bale. The method includes providing a predetermined number of helical wraps to be applied between the first and second bale positions, determining a rate of rotation of the bale, and determining a size of the bale. The method also includes using the rate of rotation of the bale and the size of the bale to calculate an axial speed that a twine dispenser should be moved along the axial length in order to provide the predetermined number of helical wraps between the first and second bale positions. The method further includes moving the twine dispenser from the first bale position toward the second bale position at the axial speed.

A further aspect of the present invention relates to a baler having a baling chamber for forming a bale. The bale includes first and second bale positions separated by an axial length along the bale. The baler includes a twine guide for applying twine to the bale, a size sensing mechanism for determining a size of the bale within the baling chamber, a rotation sensor for determining a rate of rotation of the bale within the baling chamber, and a twine guide actuator for moving the twine guide between the first and second bale positions. The baler also includes a controller that interfaces with the size sensing mechanism, the rotation sensor, and the twine guide actuator. The controller is adapted to use the rate of rotation of the bale and the size of the bale to calculate an axial speed that a twine dispenser should be moved along the axial length in order to provide a predetermined number of helical wraps between the first and second bale positions. The controller is also adapted to cause the twine guide actuator to move the twine guide from the first bale position toward the second bale position at the axial speed.

BRIEF DESCRIPTION OF THE DRAWINGS

The accompanying drawings, which are incorporated in and constitute a part of the specification, illustrate several aspects of the invention and together with the description serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
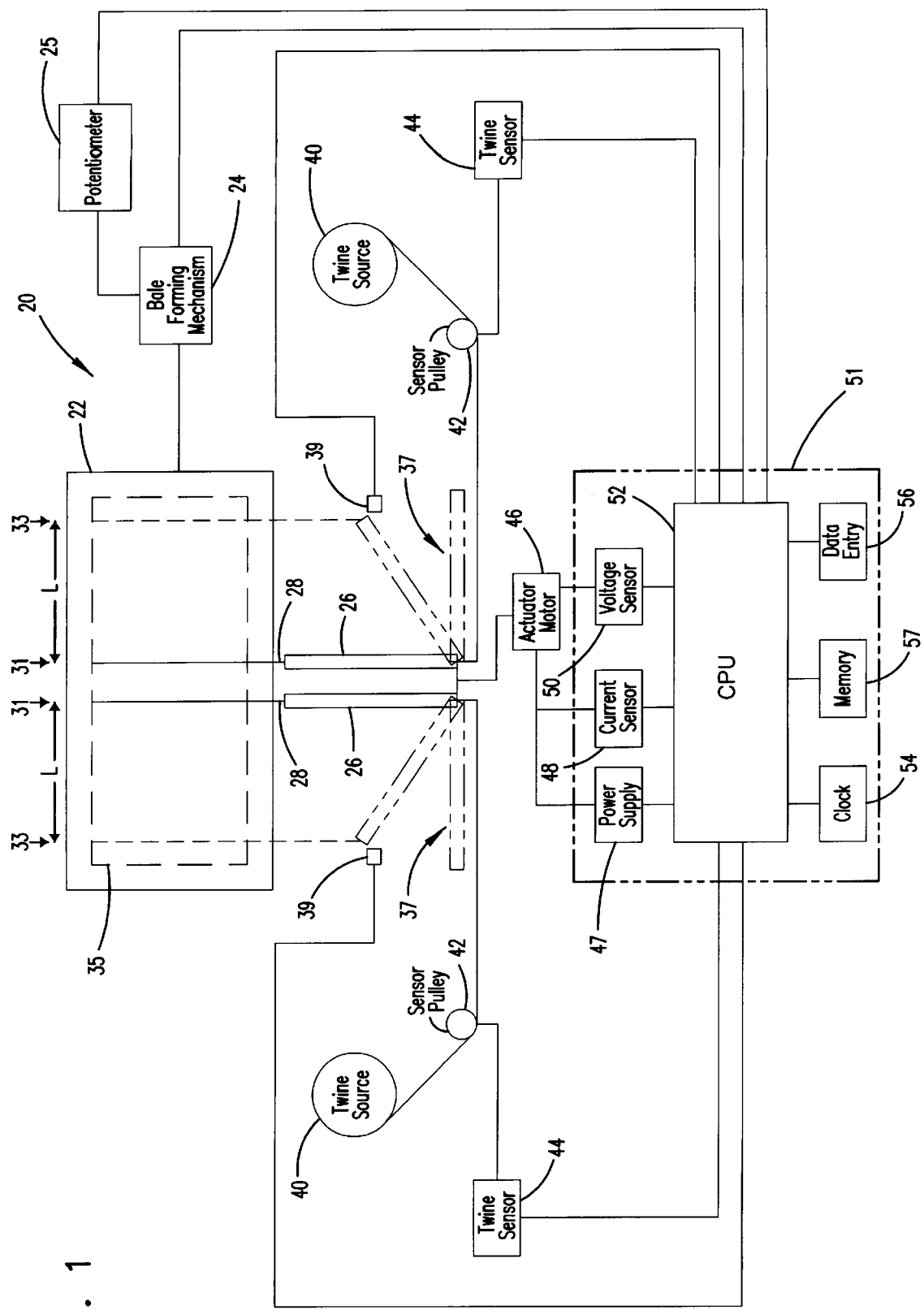
FIG. 1 is a schematic diagram of an embodiment of a baler constructed in accordance with the principles of the present invention.

FIG. 1 provides a schematic illustration of an exemplary baler 20 constructed in accordance with the principles of the present invention. The baler 20 includes a cylindrical baling chamber 22 into which forage crops are introduced. The baler 20 also includes a bale forming mechanism 24 positioned within the baling chamber 22. It will be appreciated that the bale forming mechanism 24 can have a variety of known configurations suitable for forming cylindrical bales within the baling chamber 22. In one particular embodiment of the present invention, the bale forming mechanism 24 includes a plurality of endless forming belts or rollers (not shown) disposed within the baling chamber 22 for rotatably shaping or forming forage crop fed within the chamber 22 into a bale 35. A potentiometer 25 is used to monitor the size (i.e. the diameter or radius) of a bale 35 formed within the baling chamber 22.

The baler 20 also includes a twine applying arrangement for applying twine 28 about the bale 35 as the bale 35 is rotated by the bale forming mechanism 24. As shown in FIG. 1, the twine applying arrangement includes a pair of twine guides 26 through which the twine 28 is dispensed about the bale 35. Each twine guide 26 is pivotally movable between a central position 31, an end wrap position 33, and a fully retracted position 37. The central and end positions 31 and 33 are separated by axial lengths L along the bale 35. Switches or sensors 39 are used to detect when the twine guides 26 are positioned in the end wrap positions 33.

The twine 28 is provided to the twine guides 26 by twine sources 40, such as spools. Sensor pulleys or wheels 42 are positioned between the twine sources 40 and the twine guides 26. The twine 28 is wrapped or pulled around the sensor pulleys 42 such that the sensor pulleys 42 rotate as the twine 28 is dispensed from the twine sources 40. Twine sensors 44, such as rotary encoders, hall effect sensors, optical sensors or mechanical counters, monitor the rotation of the sensor pulleys 42. For example, in one embodiment of the invention, the sensor pulleys 42 can comprise pulleys having flags, and the twine sensors 44 can comprise reed switches for detecting the flags as the pulleys rotate. Signals generated from the twine sensors 44 are used to calculate the length of twine 28 dispensed from the twine sources 40, as well as the rate at which the twine 28 is dispensed from the twine sources 40.

While two twine guides 26 are shown in FIG. 1, it will be appreciated that a single guide for applying twine from one end of a bale to the opposite end of the bale could also be used. Also, while two end sensors 39 and two sets of sensor pulleys 42 and twine sensors 44 are shown in FIG. 1, in certain embodiments of the invention, a single end sensor 39 and/or a single arrangement for monitoring twine speed can be used.

The baler 20 further includes an actuating mechanism for moving the twine guides 26 between the central, end wrap, and retracted positions 31, 33 and 37. The actuating mechanism includes an actuator or electric motor 46, such as a DC electric motor, driven by a power or voltage supply 47. A controller or central processing unit (CPU) 52 controls the output of the voltage supply 47 such that pulse width modulated driving pulses are provided to the motor 46. The electric motor 46 is mechanically coupled to the twine guides 26, by conventional techniques, such that the electric motor 46 is adapted to selectively move the twine guides 26 between the central and end retracted positions 31, 33 and 37. A first electric sensor, such as a current sensor 48, monitors the current provided to the electric motor 46 from the power supply 47. The output (i.e. signals) from the current sensor 48 is used to detect stall currents when the electric motor 46 is driven at 100% duty. A second electric sensor, such as a voltage sensor 50, measures the voltage across the electric motor 46 as the electric motor 46 freewheels between driving pulses of the pulse width modulated voltage provided by the voltage supply 47.

The CPU 52 of the baler 20 can include any type of controller or processor such as a micro-controller, a mechanical controller, an electrical controller, a hardware driven controller, a firmware driven controller or a software driven controller. In one particular embodiment, the CPU 52 may include a processing unit, memory, circuitry for connecting the various parts, and input and output means whereby a user can input and output information. The CPU 52 preferably interfaces with the bale forming mechanism 24, potentiometer 25, twine sensors 44, voltage supply 47, voltage sensor 50, current sensor 48, switches 39 and the sensor pulley 42. The CPU 52 also interfaces with data storage memory 57, a timer 54 and a user interface station 56 such as a keyboard, keypad, display, printer or other data input/output device. The CPU 52, power supply 47, current sensor 48, voltage sensor 50, timer 54, memory 57 and user interface 56 are incorporated together to form a control unit 51.

The twine applying arrangement provides several types of wraps around the bale 35. For example, the twine applying arrangement provides central wraps at the central positions 31, end wraps at the end wrap positions 33, and intermediate wraps between the central and end positions 31 and 33. The intermediate wraps preferably have a continuous helical configuration. A predetermined numbers of central wraps, end wraps and intermediate wraps can be stored in the memory 57 associated with the CPU 52. For example, in one particular embodiment, an operator can select one of several wrapping options. If the operator selects a first option, a first predetermined number of central wraps, intermediate wraps and end wraps will be applied to the bale 35. If the operator selects a second option, a second predetermined number of central wraps, intermediate wraps and end wraps (i.e. twice as many as the first option) will be applied to the bale 35. It will be appreciated that any number of different wrapping options can be stored in memory and accessed via the user interface 56. In certain embodiments, customized wrapping options or patterns can be entered into the system via the operator. The term "predetermined number" is intended to mean that the number of wraps is known or accessible to the controller at least some time before the wraps are applied to the bale 35.

In general use of the baler 20, the baling chamber 22 is initially filled with forage crop. While the baling chamber 22 is being filled, the twine guides 26 are oriented in the retracted positions 37. When the bale 35 within the baling chamber 22 reaches a desired size, as indicated by the potentiometer 25, the twine guides 26 are concurrently moved from the retracted positions 37 to the central positions 31.

When the twine guides 26 reach the central positions 31, the rate of rotation of the bale (i.e. the number of rotations per unit time as commonly measured in rotations-per-minute) is determined by measuring the time $t_1$ it takes for one complete central wrap of twine to be dispensed around the bale 35. For example, the timer 54 is started by the CPU 52 when the twine sensors 44 sense that the twine 28 has started to be dispensed about the bale 35 at the central positions 31. As the twine 28 is dispensed, the CPU 52 monitors the length of twine 28 dispensed based on signals provided from the twine sensors 44. The CPU 52 stops the timer 54 when the length of twine 28 equals the circumference of the bale 35. It will be appreciated that the circumference of the bale 35 is known based upon the radius or diameter measurement taken by the potentiometer 25.

Once the time $t_1$ has been determined, the CPU 52 calculates a twine guide speed time $t_2$ by multiplying the time $t_1$ by the predetermined number of intermediate wraps that will be applied between the central and end positions 31 and 33 based on the wrapping option selected by the user. The twine guide speed time $t_2$ is representative of a desired speed of the twine guides 26. For example, to provide the predetermined number of intermediate wraps about the bale 35, the twine guides 26 should traverse the length L between the central positions 31 to the end positions 33 in the time $t_2$.

After the time $t_2$ has been determined, the CPU 52 determines a voltage pulse width suitable for moving the twine guides 26 at the desired rate. The twine guides remain at the central positions 31 until the predetermined number of central wraps, as determined by the wrapping option selected by the user, have been applied to the bale 35. While the central wraps are applied to the bale 35, the length of twine 28 applied to the bale 35 is monitored. When the length of twine 28 applied to the bale 35 equals a length equal to the circumference of the bale 35 multiplied by the predetermined number of central wraps, the CPU 52 causes the voltage source 47 to apply driving pulses having the desired pulse width to the electric motor 46. The pulses cause the electric motor 46 to simultaneously drive the twine guides 26 continuously at the desired speed from the central positions 31 to the end positions 33. The twine guides 26 are not stopped at any intermediate positions between the central and end positions 31 and 33. As the twine guides 26 move continuously along the bale 35, the rotation of the bale causes the twine 28 to be wrapped about the bale 35 in a helical pattern.

As the twine guides 26 move continuously toward the end positions 33, the rate of rotation of the bale 35 is monitored and the speed of the twine guides 26 is controlled. For example, the rate of rotation of the bale 35 is monitored by monitoring the speed that the twine 28 is applied to the bale 35, and the twine guide speed is controlled by monitoring the feedback of the voltage generated by the electric motor 46 as it free-wheels between voltage pulses. If the speed of the twine guides 26 is greater or less than the desired speed, the voltage pulse width provided to the electric motor 46 from the voltage supply 47 is adjusted to correct the discrepancy. Also, if the rate of rotation of the bale varies as the twine guides 26 are moved from the central position 31 to the end position 33, the speed of the twine guides 26 is altered accordingly to compensate for the variance in rotational speed of the bale 35. The monitoring of the rate of rotation of the bale 35 and the controlling of the speed of the twine guides 26 helps to ensure that the predetermined number of intermediate wraps are applied to the bale 35.

When the twine guides 26 reach the end wrap positions 33, as indicated by the end wrap position switches 39, the electric motor 46 controlling the twine guides 26 is stopped by the CPU 52 and the predetermined number of end wraps, as determined by the wrapping option selected by the user, are applied to the bale 35. While the end wraps are applied to the bale 35, the length of twine 28 applied to the bale 35 is monitored. When the length of twine 28 applied to the bale 35 equals a length equal to the circumference of the bale 35 multiplied by the predetermined number of end wraps, the CPU 52 causes the twine guides 26 to be moved toward the central positions 31 for a predetermined amount of time such that the twine 28 is doubled back upon itself to inhibit unwrapping. After the twine guides 26 have been moved toward the central positions 31 for the predetermined amount of time, the twine guides 26 are then moved to the retracted positions 37, and the twine 28 being dispensed from the twine guides 26 is cut. After the twine 28 has been cut, the wrapped bale 35 can be discharged from the baling chamber 22 and the baling process can be repeated.

Figure 2:
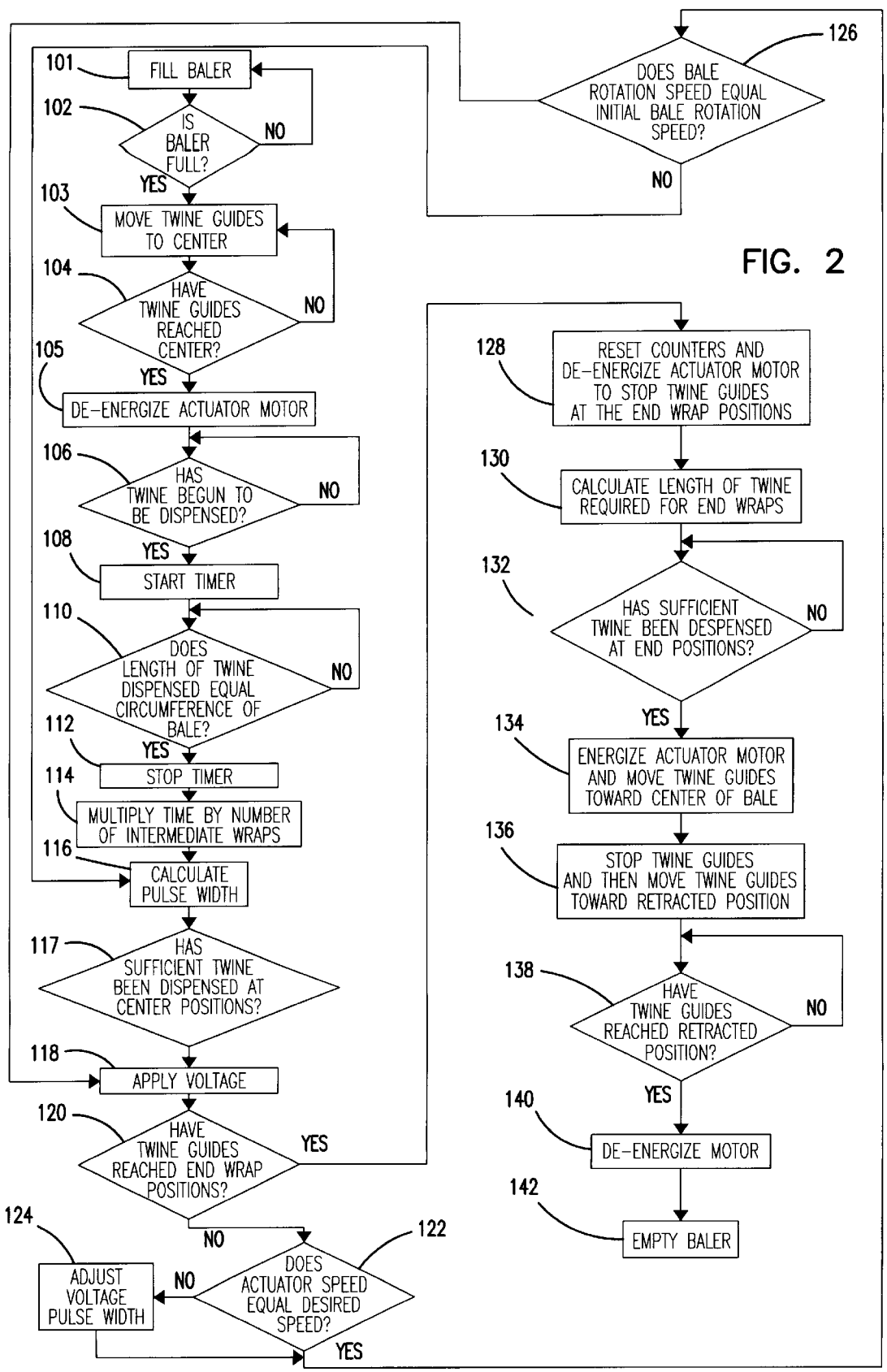
FIG. 2 is a flowchart of a method in accordance with the principles of the present invention for dispensing twine about a bale.

Referring to FIG. 2, a flowchart illustrating an exemplary method in accordance with the principles of the present invention is illustrated. Prior to beginning the method, an operator selects or enters a wrapping option having a corresponding number of center wraps, intermediate wraps and end wraps to be placed on the bale 35. During the method, an operator may update the information if desired.

At block 101 of the method sequence, the baling chamber 22 is in the process of being filled with forage crop desired to be baled. As the baling chamber 22 is filled, the potentiometer 25 measures, at block 102, the radius or diameter of the bale 35 to determine if the bale 35 has reached a predetermined size. If the bale 35 has not yet reached the predetermined size, program flow is directed to repeatedly cycle back to block 101 until such time as the bale 35 has reached the predetermined size. Once the bale 35 reaches the predetermined size, then program flow proceeds to block 103. Preferably, as the baling chamber 22 is filled, the twine guides 26 of the baler 20 are retained in the retracted positions 37.

In block 103, the twine guides 26 are moved from the retracted positions 37 toward the central positions 31. While the twine guides 26 move toward the central positions 31, the current provided to the motor 46 is monitored by the current sensor 48 as shown at block 104. When the twine guides 26 reach the central positions 31, the electric motor 46 stalls and draws a higher current that is detected by the current sensor 48. Until such time as a stall current of the electric motor 46 is detected by the current sensor 48, program flow is directed to cycle back to block 103. Upon detection of a stall current by the current sensor 48, program flow progresses to block 105 where the electric motor 46 is deenergized.

Once the twine guides 26 reach the central positions 31, twine 28 dangling from the twine guides 26 becomes caught in a gap or nip formed between the rotating bale 35 and the belts or rollers of the forming mechanism 24 causing the twine to be wrapped in circular wraps about the bale 35. At block 106, the twine sensors 44 monitor the sensor pulleys 42 to determine whether the twine guides 26 have begun to dispense twine about the bale 35. Until such time as movement of the sensor pulleys 42 is detected, the sensor pulleys 42 are monitored for movement by the twine sensors 44. Upon detection of movement of the sensor pulleys 42, the method progresses to block 108 where the timer 54 is started. While the timer 54 runs, the length of twine dispensed by each twine guide 26 is monitored by the twine sensors 44 at block 110. When the length of twine measured by one of the twine sensors 44 equals the circumference of the bale 35, the program flow proceeds to block 112 where the timer 54 is stopped.

At block 114 the time it took to place one center wrap of twine about the bale (as determined from the time on the timer in block 112) is multiplied by the predetermined number of intermediate wraps, so as to determine the total amount of time needed to place the predetermined number of intermediate wraps of twine on the bale. Program flow then proceeds to block 116.

At block 116, the pulse width of a pulse width modulated voltage that must be applied to the field windings of the electric motor 46 to produce a speed of actuation that will move the twine guides 26 from the central positions 31 to the end positions 33 in the total amount of time as determined in block 114 is calculated by the central processing unit 52. Preferably, the central processing unit 52 uses a look-up table having specific values stored in memory 57 to determine the appropriate pulse widths. The specific values of the look-up table are preferably empirically determined.

At block 117, the length of twine dispensed to the bale 35 since the twine started to be dispensed is monitored by the central processing unit 52 via data/signals generated by the twine sensors 44. Once the amount of twine dispensed to the bale 35 at each central position 31 equals or exceeds a value equal to the circumference of the bale multiplied by the predetermined number of center wraps corresponding to the particular wrapping option selected, the program proceeds to block 118 where the central processing unit 52 signals the voltage supply 47 to apply the calculated pulse-width-modulated voltage to the actuator motor 46.

Once the pulse width modulated voltage is applied to the actuator motor 46, the twine guides 26 are moved continuously from the central positions 31 toward the end positions 33 causing the twine to be helically wrapped around the rotating bale 35. At block 120, the end wrap position switches 39 are monitored by the central processing unit 52 to determine whether the twine guides 26 have reached the end wrap positions 33. If the end wrap position switches 39 have not been activated, the program flow proceeds to block 122 where the speed of the twine guides 26 is monitored. Preferably, the central processing unit 52 uses data generated by the voltage sensor 50 for monitoring the actual speed of the twine guides 26. For example, the voltage sensor 50 preferably measures the voltage generated by the electric motor 46 as it free wheels as a generator between voltage driving pulses applied by the voltage source 47. Based on the voltage reading provided by the voltage sensor 50, the central processing unit 52 can calculate the speed of the electric motor 46 and thus the actual speed of the twine guides 26. Alternatively, conventional sensors such as optical encoders can be used to monitor the speed of the twine guides 26. However, the use of conventional sensors has the inherent disadvantage of adding components with the associated probability of failure affecting the overall system reliability.

If the actual speed of the twine guides 26 differs from the actuation speed calculated at block 114, program flow proceeds to block 124 where the voltage pulse width applied to the electric motor 46 is increased or decreased a predetermined amount as determined by a conventional proportional integral derivative (PID) calculation technique. For example, if the twine guides 26 are moving too slowly via information from voltage sensor 50, the voltage pulse width applied to the electric motor 46 is proportionally increased to increase the speed of the twine guides 26 the desired amount. Similarly, if the speed of the twine guides 26 is determined to be too fast, the voltage pulse width applied to the electric motor 46 is proportionally decreased to slow the twine guides 26 to the desired speed.

Program flow then proceeds to block 126 where the speed of rotation of the bale 35 is monitored. Preferably, the central processing unit 52 monitors the rate of rotation of the twine pulleys 42 (via the twine sensors 44) and calculates the rate of rotation of the bale 35. For example, the twine sensors 44 measure the speed in which the twine 28 is being dispensed onto the bale 35 (i.e. length of twine 28 dispensed per rotation of one twine pulley=27c (radius of the pulley)). The circumference of the bale 35 is known based upon the radius/diameter measurement provided by the potentiometer 28. Also, because the speed of the twine guides 26 is known, the pitch angle of the intermediate wraps is also known. Hence, based on such known information, the central processing unit 52 can use the twine speed information generated by the twine sensors 44 to calculate the rate of rotation/frequency of revolution of the bale 35.

If the rate of rotation of the bale differs from the rate of rotation calculated at block 112, then the program flow returns back to block 116 and a new pulse width is calculated based on the different rate of rotation of the bale 35. If the rotational rate of the bale 35 is generally the same as the rotational rate calculated at block 112, then program flow goes back to block 118.

If, in block 120, it is determined that the twine guides 26 have reached the end positions 33, then counters associated with the twine sensors 34 are reset and the electric motor 46 is deenergized so as to stop movement of the twine guides 26 as shown at block 128. Once the twine guides 26 have been stopped, program flow proceeds to block 130 where the length of twine required for providing the predetermined number of end wraps corresponding to the selected wrapping option is calculated. Preferably, the amount of twine required to wrap the end wraps is calculated by multiplying the circumference of the bale 35 by the predetermined number of end wraps corresponding to the programmed/selected wrapping option.

At block 132, the length of twine 28 dispensed to the bale 35, since the counters were reset at block 128, is calculated and monitored by the central processing unit 52 via signals generated by the twine sensors 44. Once the amount of twine 28 dispensed to the bale 35 at each end wrap position 33 equals or exceeds the value calculated at block 130, the program proceeds to block 134. At block 134, the CPU 52 causes the twine guides 26 to be driven at full speed toward the central positions 31 for a predetermined time, such as 0.5 seconds, and then causes the twine guides 26 to be stopped. The driving of the twine guides 26 toward the center of the bale 35 inhibits the twine 28 of the end wraps from becoming unwrapped.

After block 134, the program flow proceeds to block 136 where the twine guides 26 are moved at full speed by the electric motor 46 toward the retracted positions 37. At block 138, it is determined whether the twine guides 26 have reached the retracted positions 37 by monitoring the current provided to the electric motor 46. For example, when the twine guides 26 reach the retracted positions 37, the electric motor 46 stalls, a stall current is generated, and the twine 28 is cut. When a stall current is generated, the program proceeds to block 140 where the actuator 46 is de-energized. After the actuator 46 is de-energized, program flow proceeds to block 142 where it is determined whether the baler chamber 22 is empty. At such time as the baler 22 is empty, as a result of the operator opening a release door and releasing the bale 35, program flow returns to block 101.

Figure 3:
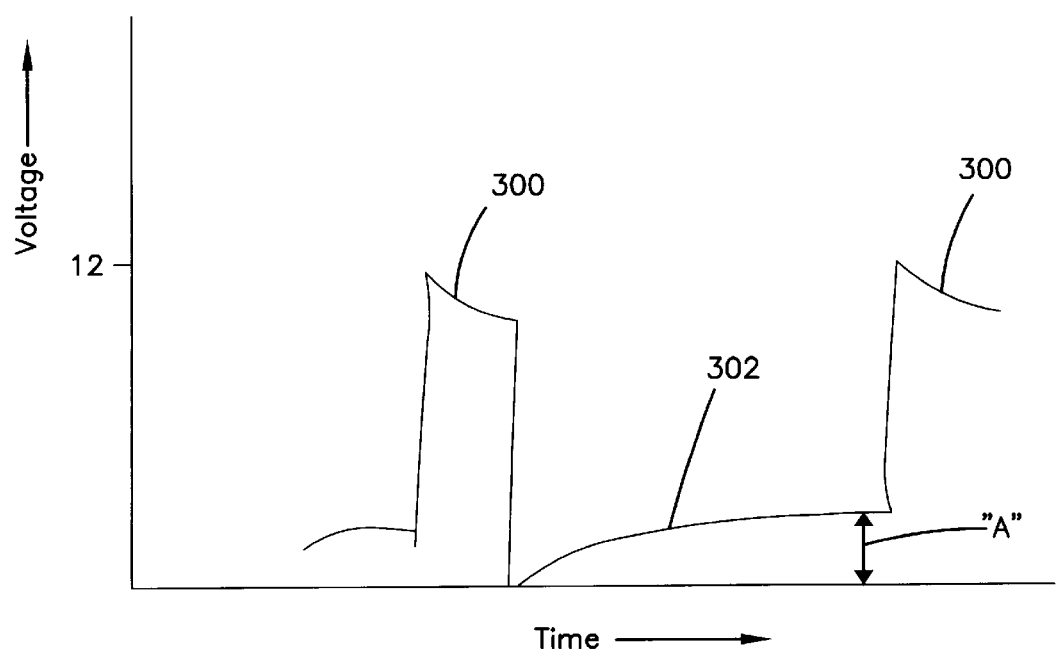
FIG. 3 is a diagram of the voltage across a baler actuator armature as a function of time when being driven by a pulse width modulated signal.

FIG. 3 illustrates the voltage across the armature of the electric motor 46 as a function of time when driven by a pulse width modulated input. Portions 300 represent pulse on times, while portion 302 represents a pulse off time in which the electric motor 46 is free wheeling. The voltage sampled in block 122 to calculate the speed of the electric motor 46 is determined at a time just before the next pulse of the pulse width modulated signal is to be applied. Thus, the voltage employed at block 122 is a voltage such as illustrated by "A" in FIG. 3.

With regard to the foregoing description, it is to be understood that changes may be made in detail, without departing from the scope of the present invention. It is intended that the specification and depicted aspects be considered illustrative only, with a true scope and spirit of the invention being indicated by the broad meaning of the following claims.

I claim:

1. A method of applying twine to a bale, the twine being applied between first and second bale positions separated by an axial length along the bale, the method comprising:

providing a predetermined number of helical wraps to be applied between the first and second bale positions;

determining a rate of rotation of the bale;

determining a size of the bale;

using the rate of rotation of the bale and the size of the bale to calculate an axial speed that a twine dispenser should be moved along the axial length in order to provide the predetermined number of helical wraps between the first and second bale positions; and moving the twine dispenser from the first bale position toward the second bale position at the axial speed.

2. The method of claim 1, further comprising monitoring the rate of rotation of the bale as the twine dispenser is moved between the first and second bale positions.

3. The method of claim 2, further comprising adjusting the speed at which the twine dispenser moves between the first and second bale positions in response to variations in the rate of rotation of the bale such that the predetermined number of helical wraps are applied between the first and second bale positions.

4. The method of claim 1, wherein the first bale position is adjacent a center of the bale, and the second bale position is adjacent an end of the bale.

5. A baler comprising:

a baling chamber for forming a bale, the bale including first and second bale positions separated by an axial length along the bale;

a twine guide for applying twine to the bale;

a size sensing mechanism for determining a size of the bale within the baling chamber;

a rotation sensor for determining a rate of rotation of the bale within the baling chamber;

a twine guide actuator for moving the twine guide between the first and second bale positions; and a controller that interfaces with the size sensing mechanism, the rotation sensor and the twine guide actuator, the controller being adapted to use the rate of rotation of the bale and the size of the bale to calculate an axial speed that a twine dispenser should be moved along the axial length in order to provide a predetermined number of helical wraps between the first and second bale positions, the controller also being adapted to cause the twine guide actuator to move the twine guide from the first bale position toward the second bale position at the axial speed.

6. The baler of claim 5, wherein the controller is adapted to monitor the rate of rotation of the bale as the twine dispenser is moved between the first and second bale positions.

7. The baler of claim 6, wherein the controller is adapted to adjust the speed at which the twine dispenser moves between the first and second bale positions in response to variations in the rate of rotation of the bale such that the predetermined number of helical wraps are applied between the first and second bale positions.

8. The baler of claim 5, wherein the first bale position is adjacent a center of the bale, and the second bale position is adjacent an end of the bale.

* * * * *